(12) United States Patent
Winter et al.

(10) Patent No.: US 9,454,384 B2
(45) Date of Patent: Sep. 27, 2016

(54) CUSTOM OPERATING SYSTEM VIA A WEB-SERVICE

(75) Inventors: Oren Winter, Kirkland, WA (US);
Kevin Corley Wonus, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1258 days.

(21) Appl. No.: 11/773,841

(22) Filed: Jul. 5, 2007

(65) Prior Publication Data
US 2009/0013061 A1 Jan. 8, 2009

(51) Int. Cl.
| | |
|---|---|
| *G06F 15/177* | (2006.01) |
| *G06Q 30/00* | (2012.01) |
| *G06F 11/00* | (2006.01) |
| *G06F 9/445* | (2006.01) |
| *G06F 9/44* | (2006.01) |
| *G06Q 40/00* | (2012.01) |
| *H04Q 3/545* | (2006.01) |

(52) U.S. Cl.
CPC ........ *G06F 9/44505* (2013.01); *G06F 9/4416* (2013.01); *G06Q 40/00* (2013.01); *G06F 8/60* (2013.01); *G06F 9/4446* (2013.01); *H04Q 3/54516* (2013.01); *H04Q 2213/13376* (2013.01)

(58) Field of Classification Search
CPC ...... G06F 8/65; G06F 15/16; G06F 17/3089; G06F 8/60; G06F 11/1433; H04L 67/02; H04L 41/082; H04Q 2213/13376
USPC ................. 718/100; 705/26.1; 717/168, 169; 709/222
See application file for complete search history.

(56) References Cited

U.S. PATENT DOCUMENTS

| | | | |
|---|---|---|---|
| 5,325,532 A | 6/1994 | Crosswy et al. | |
| 5,548,759 A * | 8/1996 | Lipe | 707/100 |
| 5,615,225 A * | 3/1997 | Foster et al. | 379/29.01 |
| 5,790,856 A * | 8/1998 | Lillich | 717/163 |
| 5,901,319 A * | 5/1999 | Hirst | 717/164 |
| 6,098,158 A | 8/2000 | Lay et al. | |
| 6,247,128 B1* | 6/2001 | Fisher et al. | 713/100 |
| 6,262,726 B1* | 7/2001 | Stedman et al. | 715/745 |
| 6,317,826 B1* | 11/2001 | McCall et al. | 713/1 |
| 6,446,260 B1* | 9/2002 | Wilde et al. | 717/173 |

(Continued)

FOREIGN PATENT DOCUMENTS

WO 0113221 A3 2/2001

OTHER PUBLICATIONS

Windows XP-Embedded, Equipment Monitor and Control, Inc. Apr. 9, 2007, 3 pages, http://www.emacinc.com/operating_systems/windows_xpe.htm.

(Continued)

*Primary Examiner* — Krista Zele
*Assistant Examiner* — Margishi Desai
(74) *Attorney, Agent, or Firm* — John Jardine; Doug Barker; Micky Minhas

(57) ABSTRACT

Operating systems can be constructed through working "in the clouds" without dependence on a specific piece of hardware. Over the Internet, an operating system is constructed based on received requests. Received requests disclose modules that are to be added to the operating system and these modules are added. A constructed operating system can be tested in context of a web server and then downloaded to an electronic device. The electronic device boots the operating system from virtual hard disk by utilization of bare metal deployment and/or non-metal deployment.

20 Claims, 10 Drawing Sheets

(56) References Cited

U.S. PATENT DOCUMENTS

| | | | |
|---|---|---|---|
| 6,512,526 B1* | 1/2003 | McGlothlin et al. | 715/762 |
| 6,543,047 B1* | 4/2003 | Vrhel et al. | 717/121 |
| 6,550,061 B1* | 4/2003 | Bearden et al. | 717/174 |
| 6,567,714 B2* | 5/2003 | O'Connor et al. | 700/95 |
| 6,735,691 B1* | 5/2004 | Capps | G06F 9/44505 713/1 |
| 6,751,658 B1 | 6/2004 | Haun et al. | |
| 6,826,616 B2* | 11/2004 | Larson et al. | 709/228 |
| 6,865,436 B2* | 3/2005 | O'Connor et al. | 700/117 |
| 6,948,169 B1* | 9/2005 | Amro et al. | 717/178 |
| 6,957,186 B1* | 10/2005 | Guheen et al. | 705/323 |
| 6,993,642 B2 | 1/2006 | Burkhardt et al. | |
| 7,085,921 B2 | 8/2006 | Frye | |
| 7,107,322 B1* | 9/2006 | Freeny, Jr. | 709/217 |
| 7,194,737 B2* | 3/2007 | Amodio et al. | 717/173 |
| 7,379,982 B2* | 5/2008 | Tabbara | 709/220 |
| 7,444,621 B2* | 10/2008 | Pletcher et al. | 717/120 |
| 7,562,346 B2* | 7/2009 | Jhanwar et al. | 717/120 |
| 7,618,317 B2* | 11/2009 | Jackson | 463/24 |
| 7,634,770 B2* | 12/2009 | Roth | 717/170 |
| 7,721,284 B2* | 5/2010 | Bykov et al. | 717/178 |
| 7,764,956 B2* | 7/2010 | Herberger et al. | 455/418 |
| 8,042,107 B2* | 10/2011 | Amodio et al. | 717/175 |
| 8,121,901 B2* | 2/2012 | Blanchard et al. | 705/26.1 |
| 8,156,488 B2* | 4/2012 | Kotamarthi et al. | 717/174 |
| 2002/0082858 A1* | 6/2002 | Heddaya et al. | 705/1 |
| 2002/0083228 A1* | 6/2002 | Chiloyan | G06F 9/4411 710/9 |
| 2002/0194394 A1* | 12/2002 | Chan | 709/319 |
| 2003/0046529 A1 | 3/2003 | Loison et al. | |
| 2003/0046614 A1* | 3/2003 | Brokish | 714/38 |
| 2003/0107584 A1* | 6/2003 | Clapper | 345/619 |
| 2003/0167354 A1* | 9/2003 | Peppers | G06F 8/60 719/327 |
| 2003/0195995 A1* | 10/2003 | Tabbara | 709/313 |
| 2003/0237035 A1* | 12/2003 | Bowers et al. | 714/724 |
| 2004/0015955 A1* | 1/2004 | Bourke-Dunphy et al. | 717/174 |
| 2004/0068722 A1* | 4/2004 | Amodio et al. | 717/169 |
| 2004/0083355 A1* | 4/2004 | Smith et al. | 713/1 |
| 2004/0093109 A1* | 5/2004 | O'Connor et al. | 700/117 |
| 2004/0093593 A1* | 5/2004 | Jhanwar | G06F 8/71 717/169 |
| 2004/0105102 A1* | 6/2004 | Tomomatsu | 358/1.1 |
| 2004/0117338 A1* | 6/2004 | Kennedy et al. | 707/1 |
| 2004/0199758 A1* | 10/2004 | Meaney et al. | 713/2 |
| 2004/0221146 A1 | 11/2004 | Baumann | |
| 2005/0149714 A1* | 7/2005 | Rhoades | 713/1 |
| 2005/0149715 A1* | 7/2005 | Rhoades | 713/1 |
| 2005/0160417 A1* | 7/2005 | Kundetkar | G06F 17/30864 717/168 |
| 2005/0195975 A1* | 9/2005 | Kawakita | 380/30 |
| 2005/0210476 A1* | 9/2005 | Wu et al. | 719/310 |
| 2005/0235278 A1* | 10/2005 | Wu et al. | 717/168 |
| 2005/0235281 A1 | 10/2005 | Lefrancois | |
| 2005/0240815 A1 | 10/2005 | Purkeypile et al. | |
| 2005/0289533 A1* | 12/2005 | Wang et al. | 717/168 |
| 2006/0031841 A1* | 2/2006 | Anand et al. | 718/102 |
| 2006/0069900 A1* | 3/2006 | Powers et al. | 711/209 |
| 2006/0075278 A1* | 4/2006 | Kallahalla et al. | 714/4 |
| 2006/0080653 A1* | 4/2006 | Siwatu et al. | 717/173 |
| 2006/0101408 A1* | 5/2006 | Kotamarthi et al. | 717/126 |
| 2006/0117172 A1* | 6/2006 | Zhang et al. | 713/2 |
| 2006/0230314 A1* | 10/2006 | Sanjar et al. | 714/26 |
| 2006/0241958 A1* | 10/2006 | Blanchard et al. | 705/1 |
| 2006/0242395 A1 | 10/2006 | Fausak | |
| 2006/0277542 A1* | 12/2006 | Wipfel | G06F 8/61 717/174 |
| 2007/0022421 A1* | 1/2007 | Lescouet et al. | 718/1 |
| 2007/0050750 A1* | 3/2007 | Bykov et al. | 717/100 |
| 2007/0074223 A1* | 3/2007 | Lescouet et al. | 718/108 |
| 2007/0078891 A1* | 4/2007 | Lescouet et al. | 707/104.1 |
| 2007/0220506 A1* | 9/2007 | Maruyama | G06F 8/65 717/168 |
| 2007/0220601 A1* | 9/2007 | Huelsbergen et al. | 726/22 |
| 2007/0256070 A1* | 11/2007 | Bykov et al. | 717/174 |
| 2007/0300221 A1* | 12/2007 | Hartz et al. | 718/1 |
| 2008/0064501 A1* | 3/2008 | Patel | 463/40 |
| 2008/0098094 A1* | 4/2008 | Finkelstein et al. | 709/220 |
| 2008/0155542 A1* | 6/2008 | Maigne et al. | 718/100 |
| 2008/0172276 A1* | 7/2008 | Burton et al. | 705/8 |

OTHER PUBLICATIONS

Windows XP Embedded: Product Overview, Microsoft Corp., 2005, 9 pages, http://download.microsoft.com/download/7/1/2/71252520-2bb9-43c3-891b-bc09bfdde152/WindowsXPEmbedded-ProductOverview.pdf.

Image-based Installation of the Operating System and the Cluster Service Using Automated Deployment Services (ADS), Microsoft Corp., 2007, 8 pages, http://technet2.microsoft.com/WindowsServer/en/library/ba672f36-2a9d-43d2-9737-ab50d5b8b71b1033.mspx?mfr=true.

* cited by examiner

CUSTOM OPERATING SYSTEM VIA A WEB-SERVICE

TECHNICAL FIELD

The subject specification relates generally to operating system construction and in particular to constructing an operating system apart from a physical machine.

BACKGROUND

An operating system functions to enable management of computer hardware and software resources. A common function of an operating system is to enable a user to navigate easily through computer resources to locate a desired resource (e.g., a location with adequate memory to store a file). However, an operating system can perform tasks that a user does not engage in that are beneficial to a computer system. For example, the operating system can prioritize resource requests for different programs without consultation from the user.

On common feature of an operating system is the use of a graphical user interface (GUI). A GUI allows a user to perform operations on system resources through utilization of icons. For example, a user can build a storage tree by creation and organization of different folder icon. A main folder set can lead to broad topics, while dependent folders (e.g., folders inside a main folder at different levels) contain information that is more specific. While this can provide a useful organization structure for the user, it also serves the purpose of resource organization.

Conventionally, device drivers are used by an operating system to allow for system integration with various hardware pieces. A device driver is software that allows the operating system to function with additional hardware. Typical devices that use a device driver to communicate with an operating system are printers, scanners, sound/video cards, etc. For example, a printer can be linked to a computer that runs a particular operating system. In order for a user to operate the printer through the operating system, a device driver is installed that allows the operating system to communicate with the printer.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Conventional operating systems can be difficult to construct and/or modify. To configure an operating system to run on a specific piece of hardware, various tools and modules are added to a core operating system. It not only takes a long time to configure the operating system correctly, but often times a specialist is required to configure the operating system. The subject specification discloses construction of an operating system through Internet manipulations that lessens the time to configure the operating system as well as allowing an average user to perform a configuration.

A user can engage a special tool (e.g., construction wizard) through a graphical user interface that enables the user to create and/or modify an operating system. The tool can receive requests on modules that are to be incorporated in the operating system. A build component constructs the operating system over the Internet. The operating system can be tested on the Internet in the context of a web server and then downloaded on an electronic device.

The subject specification also discloses information that relates to booting an operating system from virtual hard disk. A constructed operating system is downloaded to a bare piece of hardware on an electronic device. The electronic device places the hardware on the virtual hard disk. From the virtual hard disk, the operating is booted without needing full installation or without interference on other programs of the electronic device (e.g., another operating system).

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
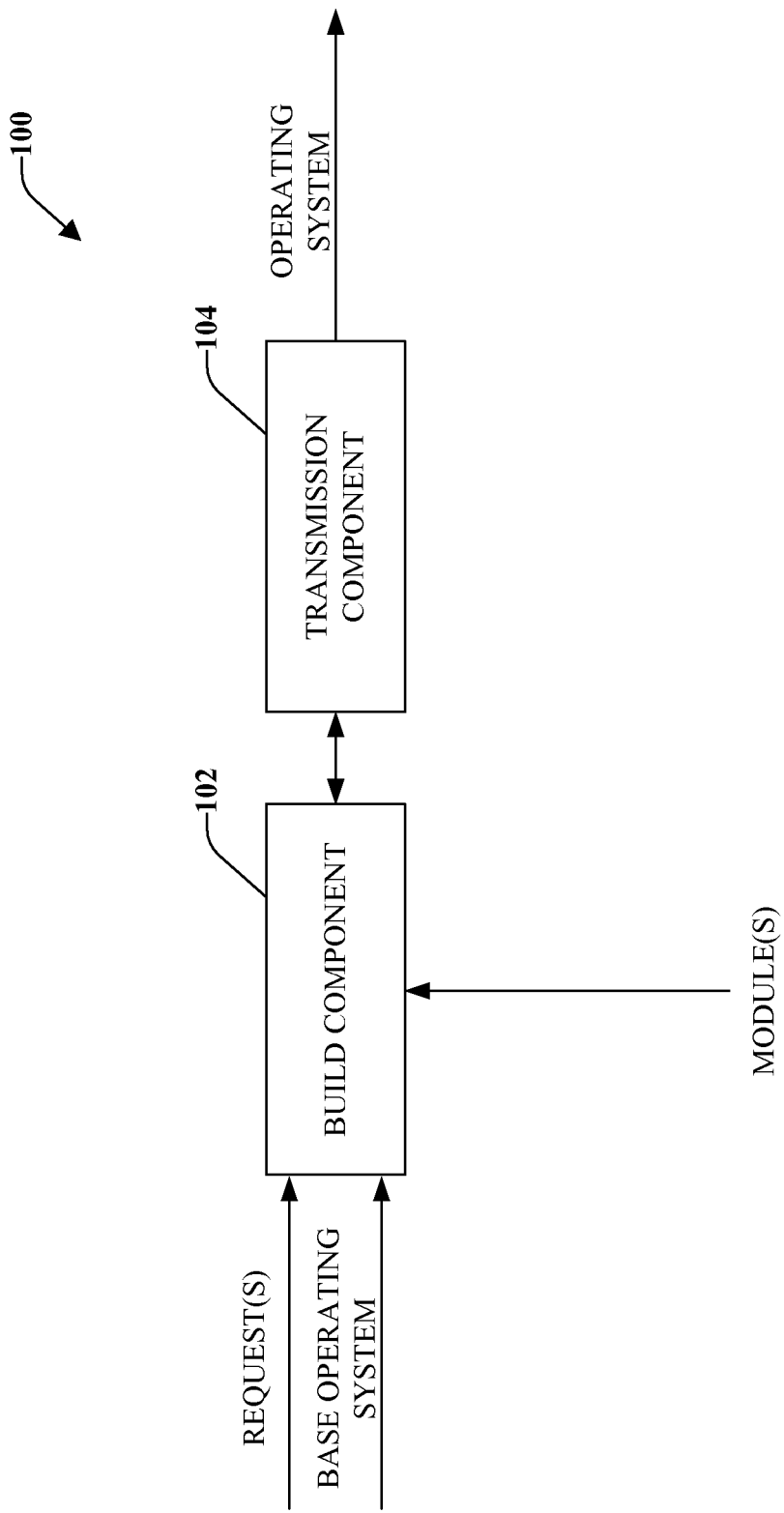
FIG. 1 illustrates a representative operating system modification system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Conventional operating systems can be difficult and tedious to build. Constructing an operating system "in the clouds" (e.g., over the Internet, in a dynamic environment, etc.) can allow for quicker development of an operating system. Furthermore, operating system testing can take place over remotely that allows for determinations on the functionality of the operating system.

FIG. 1 discloses an example online system 100 for modification of an operating system. The subject specification discloses information for creating an operating system online that can be downloaded to a device capable of running the operating system. The system 100 can be on the Internet and hosted by a web server. A user can engage the system 100 through utilization of a graphical user interface. For example, the user can connect to the Internet with a personal electronic device (e.g., cellular telephone, personal digital assistant, laptop computer, etc.) though a browser. The monitor of the electronic device can display a wizard that employs a graphical user interface.

A build component 102 facilitates modification of an operating system located online. Modification includes construction (e.g., creating a new operating system), alteration (e.g. changing an existing operating system), and the like. The build component 102 receives requests as to what features are to be incorporated into an operating system. The build component 102 can gather different modules that relate to the received request. For example, a received request can be to include a module to support a specific mouse. The build component 102 can locate the appropriate module (e.g., device driver) and incorporate the appropriate module into an operating system.

According to one embodiment, the build component employs a base operating system. A base operating system can be a skeleton operating system that has bare components for operating. For example, the base operating system can include a memory allocation module. Since many operating systems operate with digital memory, it can be beneficial for an operating system to have a memory allocation module. The base operating system assures the memory allocation module is present even if the user does not explicitly request the memory allocation Since commonly, memory allocation is an important function of an electronic device, use of the base operating system assures this is part of the operating system even if a user forgets to select the memory allocation module. Thus, use of a base operating system allows for inclusion of important modules. The build component 102 can configure to allow for elimination of base operating system modules. For example, if a request is received to remove the memory allocation module, then the build component 102 can eliminate the module. However, the build component 102 can also prevent removal of at least some base operating system modules.

The build component 102 can construct an operating system with different modules that relate to received requests. For example, five requests can be received; four requests to include modules and a request to remove one of the four requested modules. This can be done with or without employment of the base operating system. The build component 102 can include the four requested modules as well as remove the requested module.

For example, a user can be developing an operating system for a digital camera. The user can request that modules for zooming, focusing, contrasting, and saving be included in the operating system. However, the size of the constructed operating system can be larger in size then what the user originally desired. A request can be received that the zooming module should be removed to save memory. The build component 102 can then remove the zooming module.

The build component 102 can alter an operating system transferred from an auxiliary location. According to one embodiment, the auxiliary location is a device capable of running the operating system. The device is a physical device and not a component that operates online alone (e.g., the device can connect to the Internet and perform online operations, but runs at least part of the operating system on a local piece of hardware). In this embodiment, an operating system can be uploaded to the Internet from a personal electronic device (e.g., cellular telephone, personal digital assistance, etc.). According to another embodiment, the auxiliary location is a holder of a base operating system that is used by the build component 102 to create an operating system.

A transmission component 104 emits a modified operating system. The modified operating system can be a newly created operating system or an existing operating system that has at least one alteration. This can be done through a wired or wireless communication. Commonly the operating system is emitted to a device capable of running the operating system. For example, the system 100 can receive a request to emit the operating system to a cellular telephone. The transmission component 104 emits the operating system; however, it is to be appreciated that an emitted operating system does not need to be received. There are other possible intended locations for the emitted operated system. For example, a request can come from a first device (e.g., personal digital assistant) that a camera operating system is to be communicated to a storage location of a second device (e.g., removable storage medium of a laptop computer.) The transmission component 104 can send the operating system to the second device.

According to one embodiment, an operating system is constructed at another location. The operating system is uploaded to the system 100. The build component 102 makes a modification on the operating system (e.g., adds a module to the operating system.) The operating system is transmitted to another location through the transmission component 104.

Figure 2:
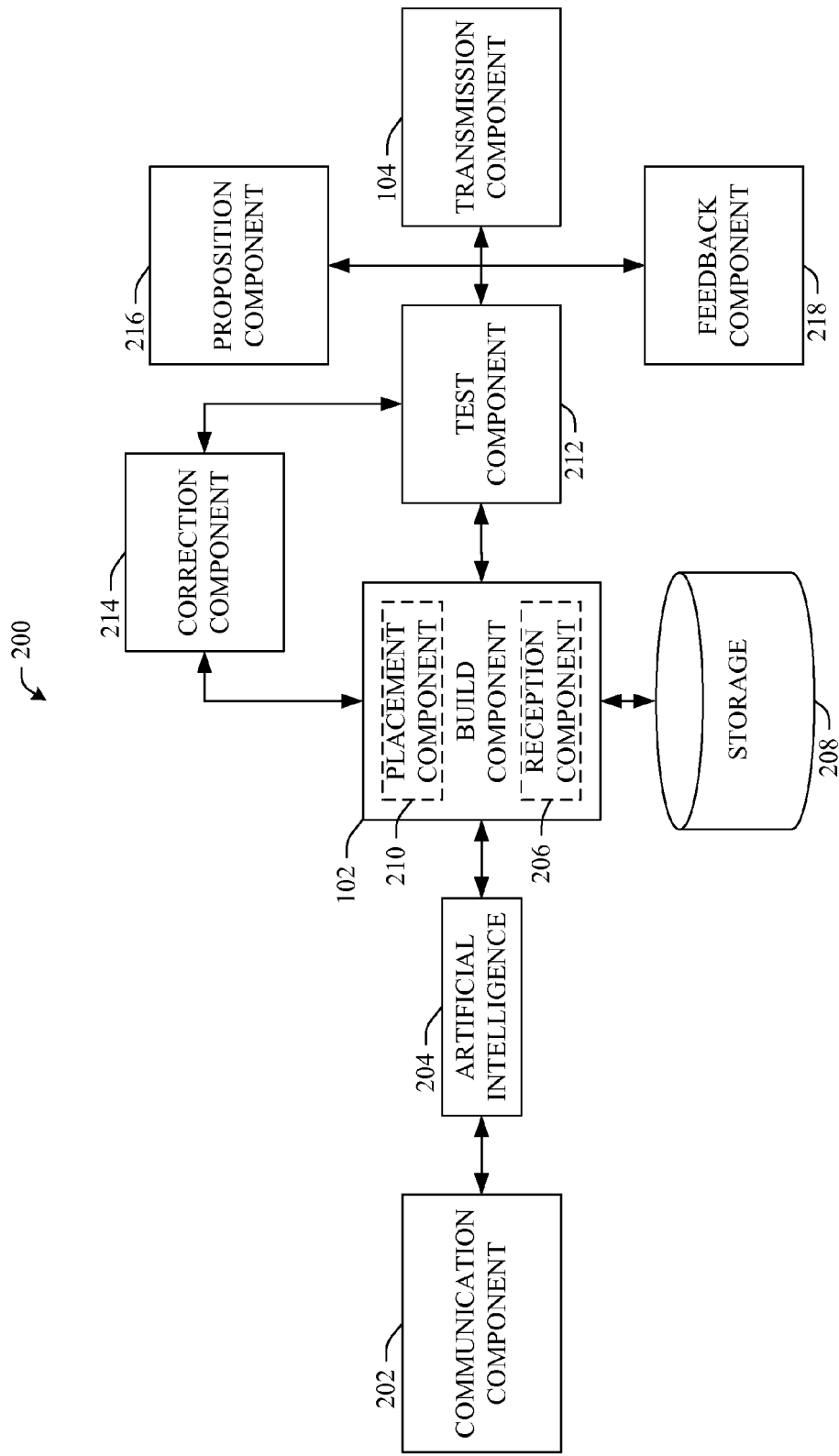
FIG. 2 illustrates a representative operating system modification system with various components in accordance with an aspect of the subject specification.

FIG. 2 discloses an example system 200 for modification of an operating system. The system 200 can be organized in different locations; for example, different components can connect to the Internet. A communication component 202 receives information that relates to the modification of the operating system. The communication component 202 can receive initial instructions that an operating system is to be constructed. Furthermore, the communication component 202 can receive at least one request for a module to be included in the operating system. The communication component 202 can integrate with the transmission component 104 to operate together as a single component.

The system 200 can employ artificial intelligence 204 that can make at least on inference or at least one determination or at least one of each for approval of a request to include a module in the operating system. Various scenarios can occur that would be processed by the artificial intelligence 204. For example, a request can be made to add a module to an operating system that has been previously added. The artificial intelligence 204 can make a determination that the module should not be added and send a notice to a requester through the communication component 202 that the request has been denied.

Artificial intelligence 204 can employ one of numerous methodologies for learning from data and then drawing inferences and/or creating routes from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein.

Methods also include methods for the capture of logical relationships such as theorem provers or more heuristic rule-based expert systems. Inferences derived from such learned or manually constructed models can be employed in optimization techniques, such as linear and non-linear programming, that seek to maximize some objective function. For example, maximizing the efficiency of a created operating system, minimizing the amount of storage space required to hold the operating system, minimizing the cost of the operating system, and so on.

The build component 102 constructs the operating system based on requests by an electronic device. A reception component 206 obtains at least one module capable of integrating with the operating system. Commonly, the modules are obtained from storage 208; however, they can be gains through other manners. For example, modules can be obtained from a remote location through utilization of the communication component 202.

The reception component 206 can also obtain an operating system base utilized by the build component 102. An operating system base can function as a skeleton that includes commonly used modules. The operating system base can be obtained from storage 208 as well as from a remote location. The reception component 206 can communicate with the artificial intelligence 204 to determine which operating base to utilize.

A placement component 210 integrates at least one module into an operating system. For example, the build component 102 can obtain a base operating system. The reception component 206 can retrieve a module for placement into the operating system. The reception component 206 then integrates the module with into the base operating system. This can include modifying computer code of a currently inputted module, previously inputted module and/or the base operating system. In addition, this can include the writing of additional code that bridges between different modules. According to one embodiment, there is only one module to be used to create an operating system. Integration of at least one module into an operating system can include making a single module operating system.

The storage 208 can be used to hold the operating system. There can be various benefits to retention of the operating system. For example, a cellular telephone company can create the operating system. Cellular telephones manufactured subsequent to the creation of the operating system can receive the operating system from the system 200. This allows one customized operating system to be configured to a large number of electronic devices.

Addition of different modules can create undesirable results concerning an operating system. Therefore, a test component 212 can perform diagnostic checks on the operating system to determine functionality. The test component 212 determines if there is at least one error in the modified operating system. The test component 212 can function after the addition of a module, after tentative completion of the operating system, or at other times. The test component 212 can function without downloading of the operating system; this means that the testing can take place over the Internet. Bare metal deployment and/or non-metal deployment can be utilized by the test component 212 in determining functionality of the operating system.

If an error is discovered, then the correction component 214 can attempt to fix the error. This can take place according to a number of different embodiments. According to one embodiment, the correction component 214 can have a capability of fixing an error determined by the test component. According to another embodiment, the correction component 214 transfers a message to the build component 102 that a corrupt module should be removed and replaced. The placement component 210 can be configured to perform module removal. The test component 212 and the correction component 214 can integrate together and the test component 212 determines and fixes errors.

If an operating system is successfully tested, then a proposition component 216 can make suggestions as to what modules can be added to the operating system. For example, a user can be building an operating system for a portable digital audio player. The user can add a module to the operating system to store and sort music files. The artificial intelligence 204 can make a determination from previous engagements that individuals who add a store and sort music module typically want a module that plays music files. The proposition component 216 can suggest to the user that the operating system should have a music player module. The user can have a decision on if the module should be added.

The transmission component 104 can emit the operating system to the user. Furthermore, the transmission component 104 can engage with a feedback component 218 that obtains reaction information that relates to the modified operating system. For example, a user can download the operating system and boot the operating system from a virtual machine. However, various errors can be encountered through use of the operating system. The feedback component 218 gathers the errors and can transfer the errors to the artificial intelligence 204.

The artificial intelligence 204 can consider errors when performing functions upon future operating systems. For example, if a specific music player module does not have adequate compatibility with a compression module, then when the compression module is selected, a different music player module is incorporated into the operating system.

Figure 3:
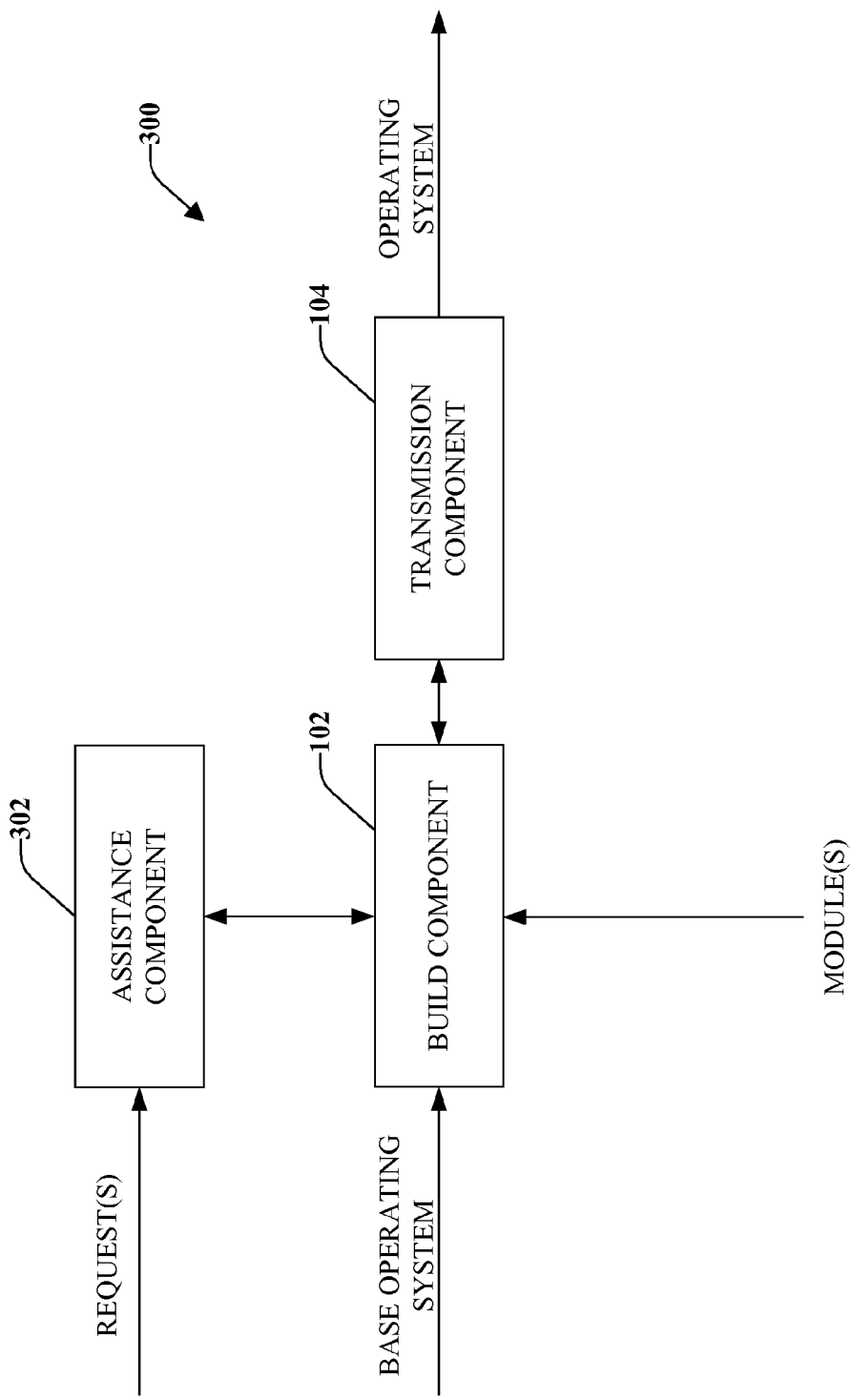
FIG. 3 illustrates a representative operating system modification system with an assistance component in accordance with an aspect of the subject specification.

FIG. 3 discloses an example system 300 for creation of an operating system through use of an assistance component 302. A user can desire to create a custom operating system. The user can connect to the internet and engage in the system 302. A request to build an operating system can arrive at an assistance component 302. The assistance component 302 provides a tool to a user for modification of the operating system. For example, the tool can be a 'wizard' that leads a user through creation of an operating system. The 'wizard' can ask a user what features the user wants in the operating system and the assistance component 302 can select modules based on requests of the user.

The tool can be designed with regard to a likely developer. For example, if the developer is a consumer who purchased an electronic device that will use the operating system, then the tool should be simple and easy to use. However, if the developer is a sophisticated, high-level programmer, then the tool can be more specific and complicated while allowing for greater flexibility.

The build component 102 creates the operating system based on requests of the user. The build component 102 can function with a base operating system. Selection of the base operating system can be done through artificial intelligence 204 of FIG. 2, through specific user request, or the like. The transmission component 104 can transfer the operating system to a final location. This can be done automatically (e.g., when the operating system is complete) or done when a request is received from an electronic device.

Figure 4:
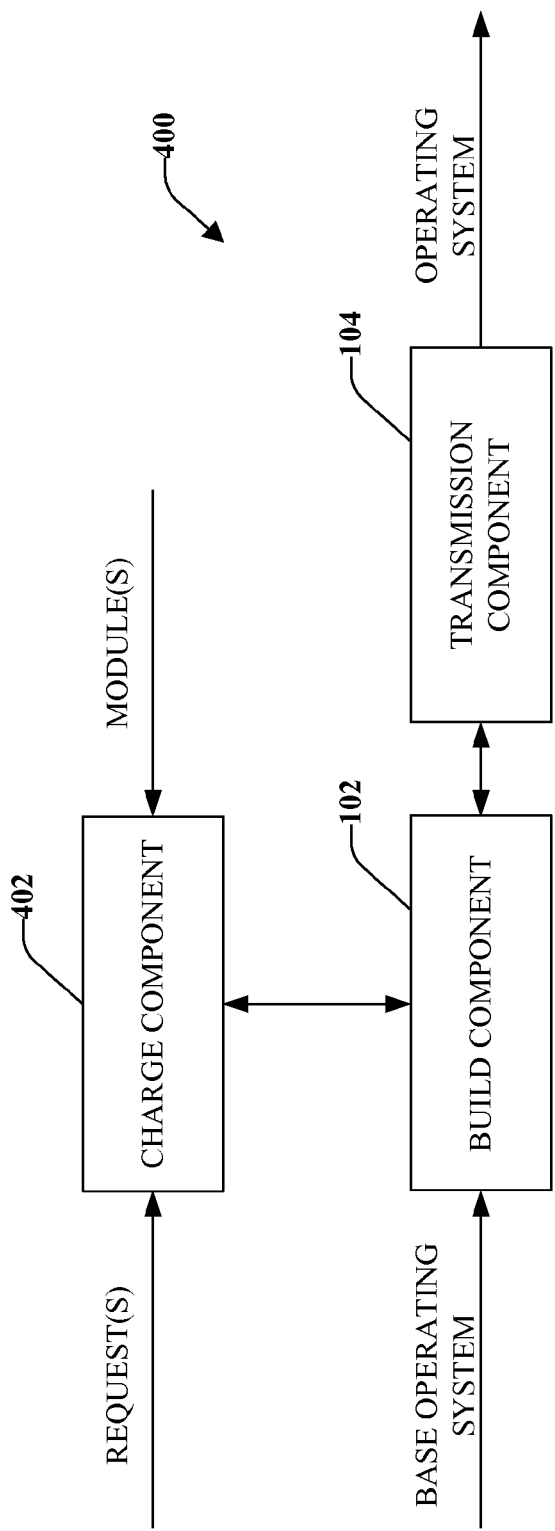
FIG. 4 illustrates a representative operating system modification system with a charge component in accordance with an aspect of the subject specification.

FIG. 4 discloses an example system 400 for creation of an operating system in conjunction with a charge component 402. The charge component 402 performs at least one financial function in conjunction with modification of the operating system. Financial functions can include debiting an account, calculating an overall cost, creating an itemized receipt, etc.

According to one embodiment, a user uses a credit card number to engage the charge component 402. For each module added to the operating system, a cost can be incurred. For example, adding an encryption module can cost 'X' price while adding a compiler component costs 'Y' price. The credit card account linked with the number is debited the appropriate amount. Furthermore, the charge component 402 can configure to pay suppliers of different modules.

A build component 102 operates to construct the operating system as described in the subject specification. The build component 102 can utilize a base operating system to construct the operating system. The transmission component 104 can emit a constructed operating system to an auxiliary location (e.g., electronic device.) The charge component 402 can perform prior to modification of the operating system, during modification, after modification, after transmission, etc.

Figure 5:
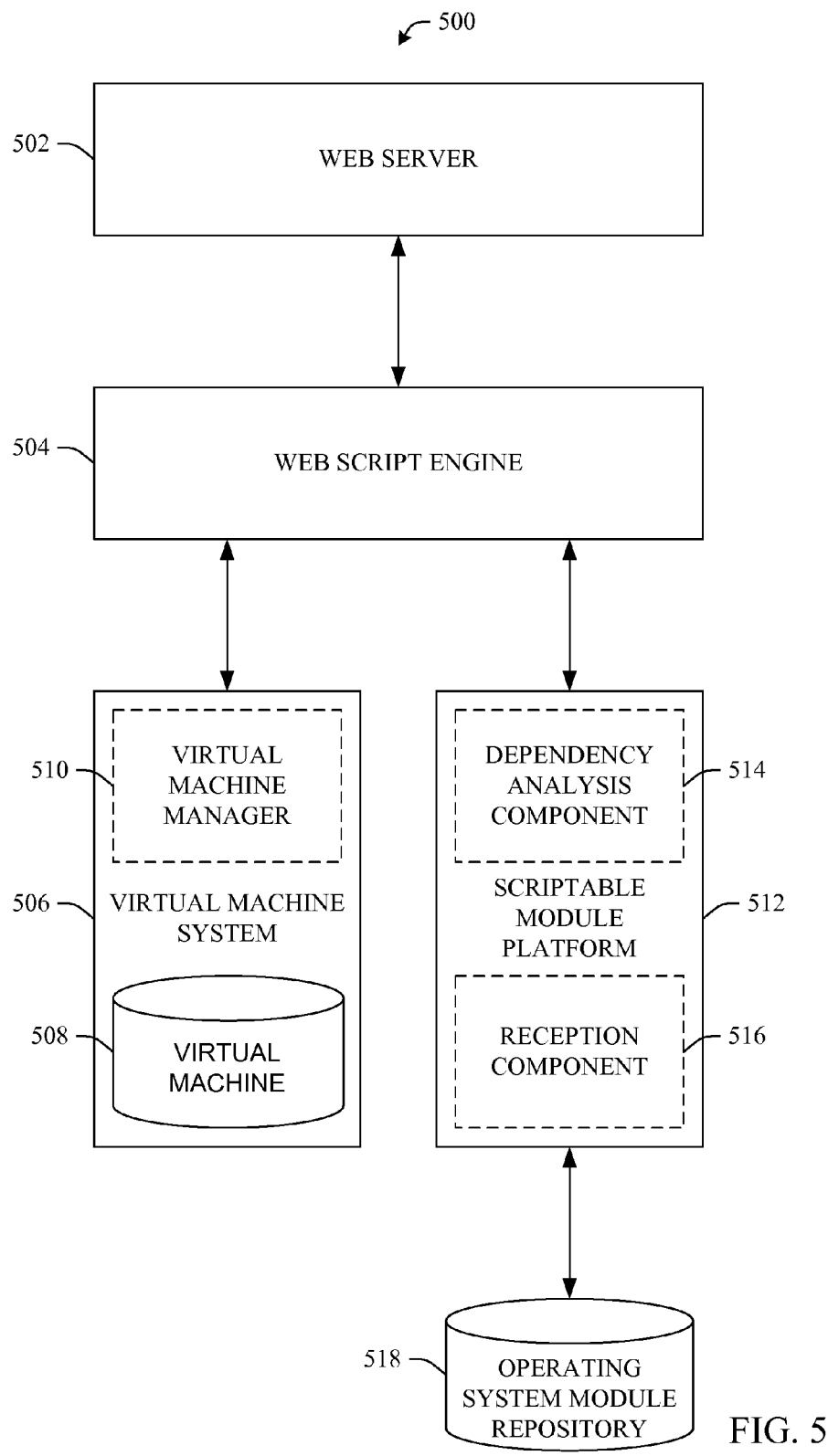
FIG. 5 illustrates a representative operating system modification system in accordance with an aspect of the subject specification.

FIG. 5 discloses an example system 500 operating at least one aspect of the subject specification. It is to be appreciated that various disclosed components could include features disclosed in FIG. 5. A web server 502 functions to engage in Internet communications with an electronic device. Examples of electronic devices are personal computer, cellular telephones, personal digital assistants, and the like.

A web script engine 504 allows information to be typed from a key board and communicated with the system 500. A virtual machine system 506 holds a virtual machine 508 and a virtual machine manager 510. The virtual machine system 506 is an environment from which an operating system can boot. The virtual machine 508 (e.g., virtual hard disk) is where the operating system boots and the virtual machine manager 510 coordinates operations of the virtual machine 508.

To build and/or modify an operating system to boot on the virtual machine, there can be use of a scriptable module platform 512. The scriptable module platform can include a dependency analysis component 514 and a reception component 516. The reception component 516 can obtain modules from an operating system module repository 518. The repository 518 can hold various modules that can be incorporated into the operating system. Received modules can be scrutinized by the dependency analysis component 514. Dependence analysis can determine execution order for different modules and/or different portions of different modules.

Figure 6:
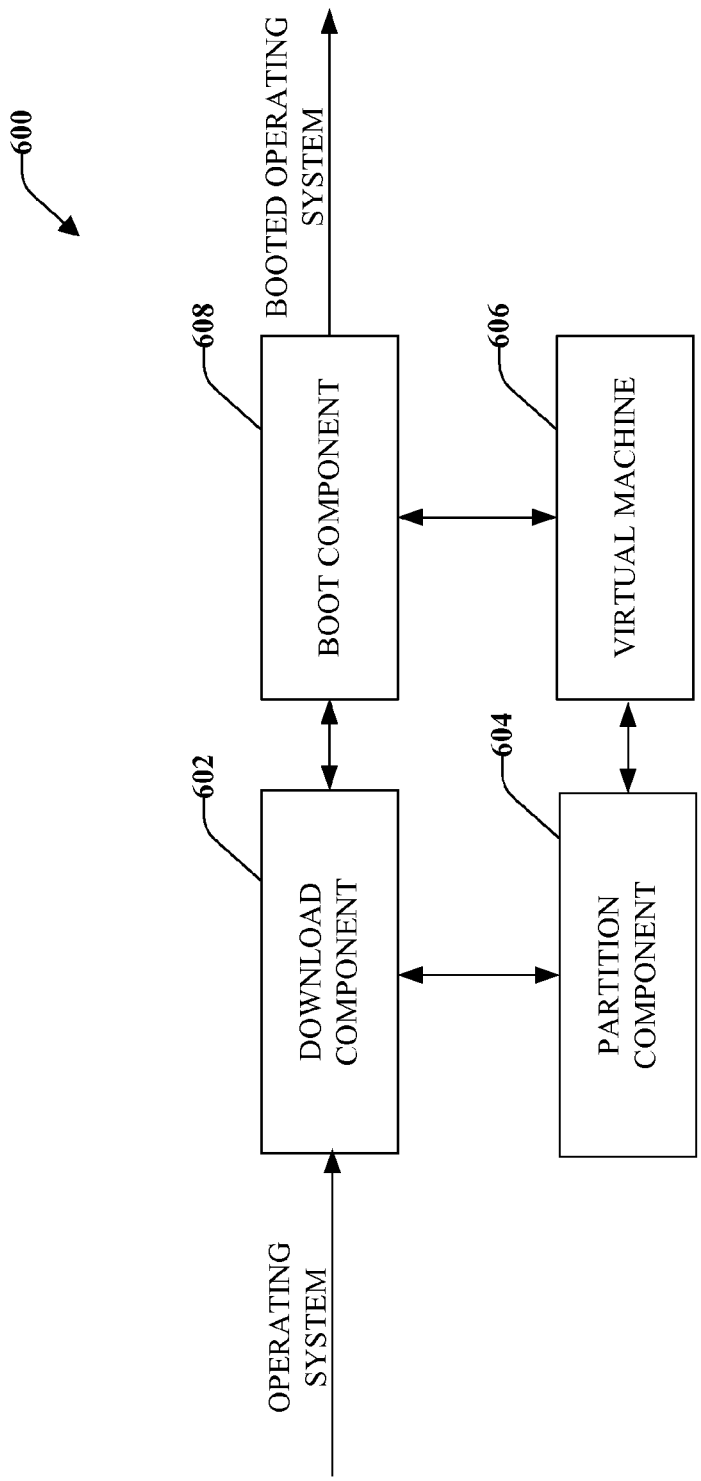
FIG. 6 illustrates a representative electronic device capable of running a modified operating system in accordance with an aspect of the subject specification.

FIG. 6 discloses an example electronic device 600 capable of receiving a constructed operating system. A modified operating system can enter the electronic device through the download component 602. The download component can operate wirelessly or through a hardwire configuration. Commonly a download is initiated through a user making a selection to download from a graphical user interface.

According to another embodiment, the download component 602 obtains the operating system from a location other then the Internet. For example, the download component 602 can obtain the information from a portable memory device (e.g., flash memory.) According to another embodiment, the operating system is downloaded from a local server that previously obtained the operating system from the Internet.

A partition component 604 can place a downloaded operating system onto at least a portion of a virtual machine 606. An example of a virtual machine 606 is a virtual hard disk. The partition component 604 can employ non-metal deployment and/or bare metal deployment. In non-metal deployment, the electronic device 600 can have an operating system functioning on a portion of the electronic device 600. The partition component 604 places the operating system on a portion of electronic device (e.g., a virtual machine 606) and runs the operating system independent of another functioning operating system. It is to be appreciated that the download component 602 can download the operating system to a virtual machine through utilization of the partition component 604.

A boot component 608 engages the operating system on the virtual machine 606. The engagement allows the operating system to function in a standard configuration. A booted operating system can perform standard operations and operate in a normal capacity. The boot component 608 can communicate with the download component 602 to perform further function. For example, the boot component 608 can discover an error in the operating system functionality. The download component 602 can send a communication over the Internet to determine a remedy for the error. The download component 602 can receive information related to correction of the error and the boot component 608 can apply the remedy to the virtual machine 606. The boot component 608 can attempt to re-boot the operating system.

The download component can function as a means for downloading an operating system to a virtual machine 604. The partition component can function as a means for introducing the operating system into a portion of the virtual machine, wherein a portion without the operating system can run a supplemental operating system. The boot component can function as a means for booting the operating system from the virtual machine.

The electronic device 600 can include a number of other components and features, which includes features disclosed in other portions of the subject specification. These component can features can stand-alone or can integrate into disclosed components. The electronic device 600 can utilize artificial intelligence similar to the artificial intelligence 204 of FIG. 2. The artificial intelligence can make inferences and/or determinations based on operations of the electronic device.

Figure 7:
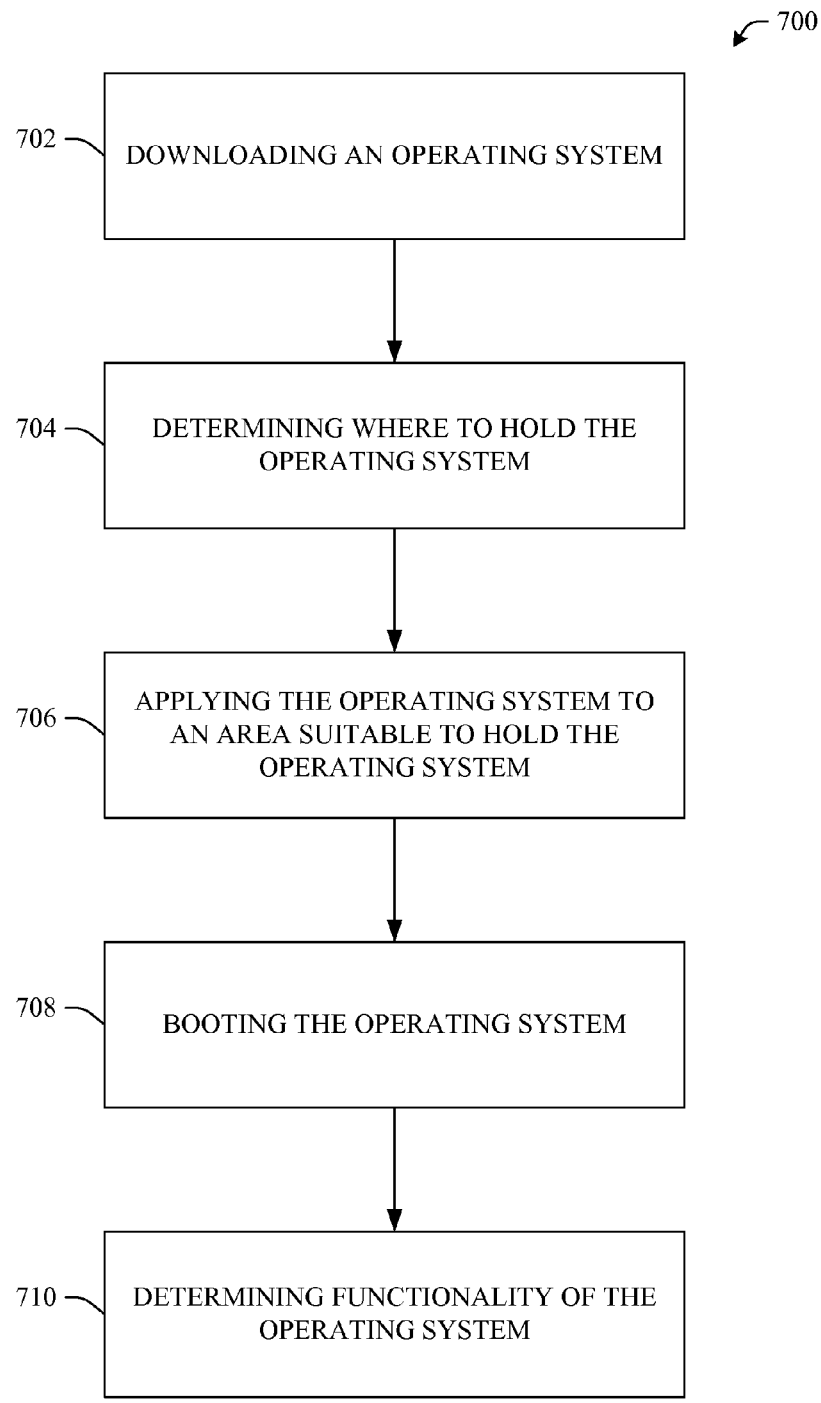
FIG. 7 illustrates a representative methodology for running a modified operating system in accordance with an aspect of the subject specification.

FIG. 7 discloses an example methodology 700 concerning operation of an electronic device capable of running the operating system. Initially, there can be downloading of an operating system 702. Commonly, the operating system is downloaded to a device capable of running the operating system; however, the methodology 700 can operate according to different embodiments.

For example, the downloading on an operating system can be to a removable storage device (e.g., flash memory device.) At a later time, the operating system can be uploaded to a device capable of running the operating system. Other actions in the methodology 700 can take place once there is a successfully download of the operating system.

Action 704 is determining where to hold the operating system. An electronic device can have various storage locations, including virtual hard disk. Various checks can take place as to where an operating system should be held. For example, if the operating system is relatively large, some storage types can be unusable and a determination is made that particular storage types are not to be used.

In another example, a check can be made to determine if the operating system is going to be booted in the relatively near future or at a further time. If the operating system is going to be booted at a relatively near time, then virtual hard disk can be appropriate. However, if the operating system is not going to be booted at a near time, then system hard drive can be appropriate.

Event 706 is applying the operating system to an area suitable to hold the operating system. Based on the determination made in act 704, the operating system is placed into the appropriate storage location. According to one embodiment, there can be an error related to the operating system. For example, the download could have been unsuccessful and the operating system can be non-functional. Therefore, the operating system can be applied to an area of the electronic device known as "trash."

There can be a booting of the operating system 708. Booting of an operating system allows the electronic device to take advantage of the features of the operating system. For example, an electronic device can operate two concurrent operating systems: an original operating system as well as the operating system downloaded in action 702.

Determining functionality of the operating system 710 can take place. A booted operating system can experience various problems. The problems can arise from a number of different sources, including incompatibility between the electronic device and the code of the operating system, errors in operating system modification, and the like. Determining functionality of the operating system 710 assists in locating errors by discovering how the operating system responds. Action 710 can include automatic determination (e.g., running internal diagnostic tests), specific determination (e.g., engaging requests by a user to perform specific functions), and the like.

Figure 8:
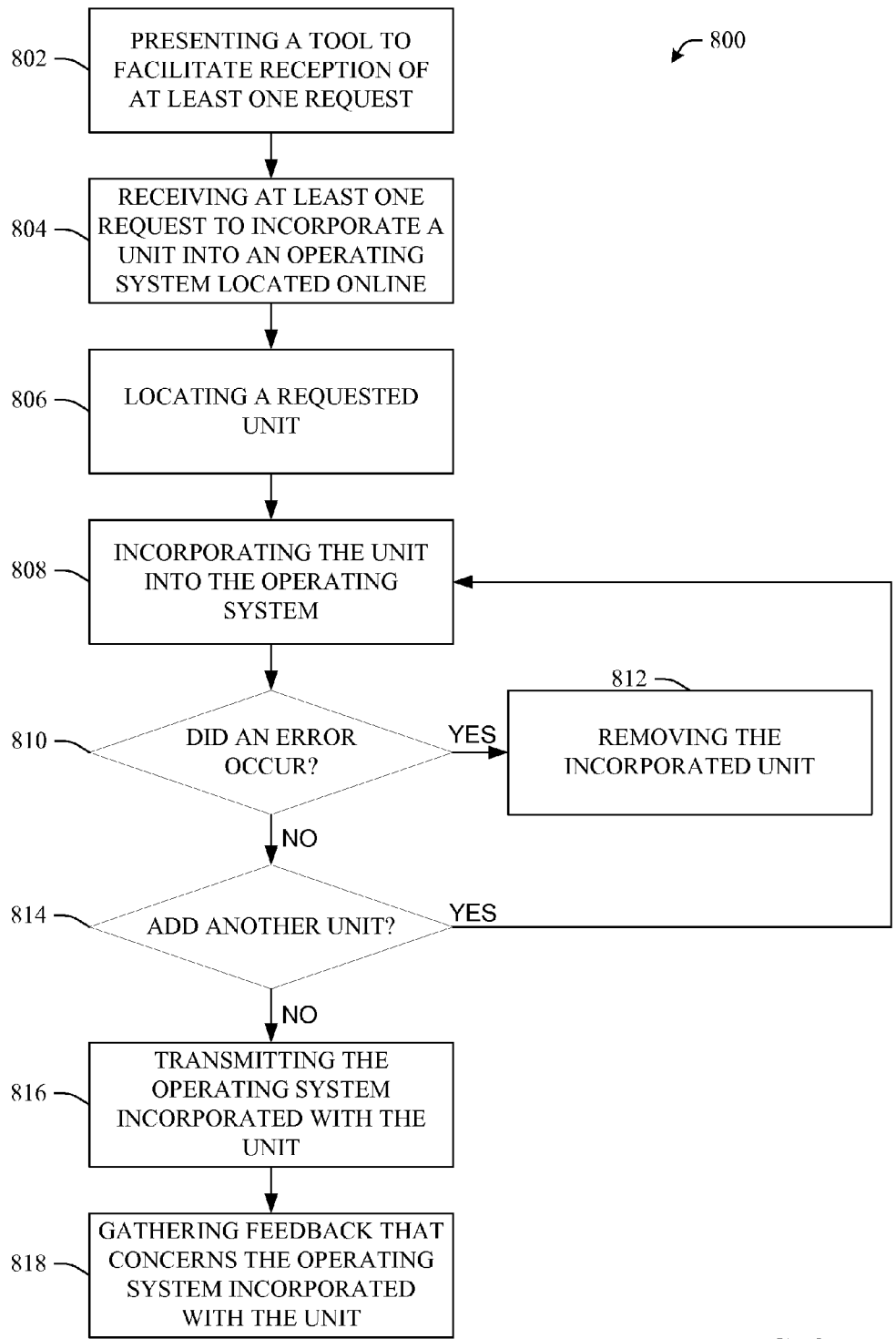
FIG. 8 illustrates a representative operating system modification methodology in accordance with an aspect of the subject specification.

FIG. 8 discloses an example methodology 800 for modifying an operating system. Modification of an operating system can take various forms. Modification can include creation of a completely new operating system (e.g., a modification from no operating system to a new operating system.) Furthermore, modification can include changing an operating system that was uploaded from an electronic device and/or storage location. Another embodiment of modification is adding units to a base operating system.

Action 802 is presenting a tool to facilitate reception of at least one request. A tool can be a graphical user interface display that guides a user through modification of an operating system. The user can make specific requests for units that should be a part of the operating system. According to another embodiment, the tool is an audio presentation that guides a user on modification of an operating system (e.g., voice prompts.) The tool can also facilitate reception of an operating system itself in addition to a request. This allows a user to upload an operating system, make a modification, and then download the operating system.

Receiving of at least one request to incorporate a unit into an operating system located online 804 can take place. A request can be an application for a new operating system as well as an application for an addition of a unit to an operating system. Furthermore, requests can come from multiple locations. For example, an industrialized company building manufactured devices can develop the operating system. Different users (e.g., project engineers) can manipulate the operating system from different locations (e.g., laptop computers) at different times.

Event 806 is locating a requested unit 806. Once a unit is requested, the methodology 800 finds the unit or creates the unit. For example, the methodology can operate over the Internet. A search can be performed as to where a specific unit can be located. If the unit is located, then the methodology 800 can retrieve the unit. However, if the unit cannot be found, different options are available. According to one embodiment, act 806 includes creating an appropriate unit (e.g., location by creation.) According to another embodiment, an error message can be transmitted that the requested module is not available.

Incorporating the unit into the operating system 808 can occur. Action 808 makes the unit part of the operating system. This can take place in various manners. For example, computer code can be written that bridges the unit and the operating system. According to one embodiment, code relating to operation of the unit is copied and then placed into code of the operating system. According to another embodiment, the operating system can map to where the unit is on the Internet. When the operating system is asked to perform a function relating to the unit, the operating system can reference the Internet module.

Asking 'Did an error occur?' can take place at event 810. Event 810 includes testing the operating system once incorporated with the unit. Incorporation of a unit to an operating system can cause various undesired results. Undesired results can cause various problems that range from poor response time to no response. Testing can take place through a diagnostic check as well as through attempting to run portions of the operating system. Testing can take place within a web server context as part of a virtual hard disk.

If an error did occur, then the methodology 800 can function in removing the incorporated unit 812. Removal of the incorporated unit can take place according to different embodiments. According to one embodiment, there can be mere deletion of code causing an error. According to another embodiment, the unit is removed and the operating system is returned to a state that was prior to the incorporation. According to yet a further embodiment, the entire operating system can be disregarded.

Once a unit that is causing errors is removed, the methodology 800 can continue to various actions. The methodology 800 can attempt to re-incorporate the requested unit. According to another embodiment, the methodology 800 can attempt to find a similar unit. If a similar unit is found, then action 808 can incorporate the new unit. According to yet another embodiment, an error message can be communicated that the unit cause an error. The methodology 800 can continue or the methodology 800 can stop.

A check can take place 814 if another unit is to be incorporated into the operating system. If another unit is to be incorporated, then the methodology 800 can return to action 808. To determine if another unit is to be added, a reference can be made to act 802 or act 804. The tool can be used to determine if other units are slated for addition to the operating system. Furthermore, there can be a list of requests received, and the methodology 800 processes the request according to an organized system (e.g., level of importance, time received, etc.)

Action 816 is transmitting the operating system incorporated with the unit. The operating system can be transmitted to various locations as well as multiple locations. Furthermore, transmission can be to a storage location. Transmission can take place multiple times for one operating system; therefore, once an operating system is transmitted, it can be retained and transmitted at a later time.

Gathering feedback that concerns the operating system incorporated with the unit 818 can occur. There can be obtaining of information that relates to the operating system. For example, if a transmission is successful, then there can be gathering of a message by the methodology 800 relating to the transmission. Likewise, if a transmission fails, action 818 can learn not only that it did fail, but also why it failed. According to another embodiment, there can be gathering of feedback regarding how an operating system is ultimately used. This includes both the use of the operating system as well as use of units incorporated into the operating system.

Figure 9:
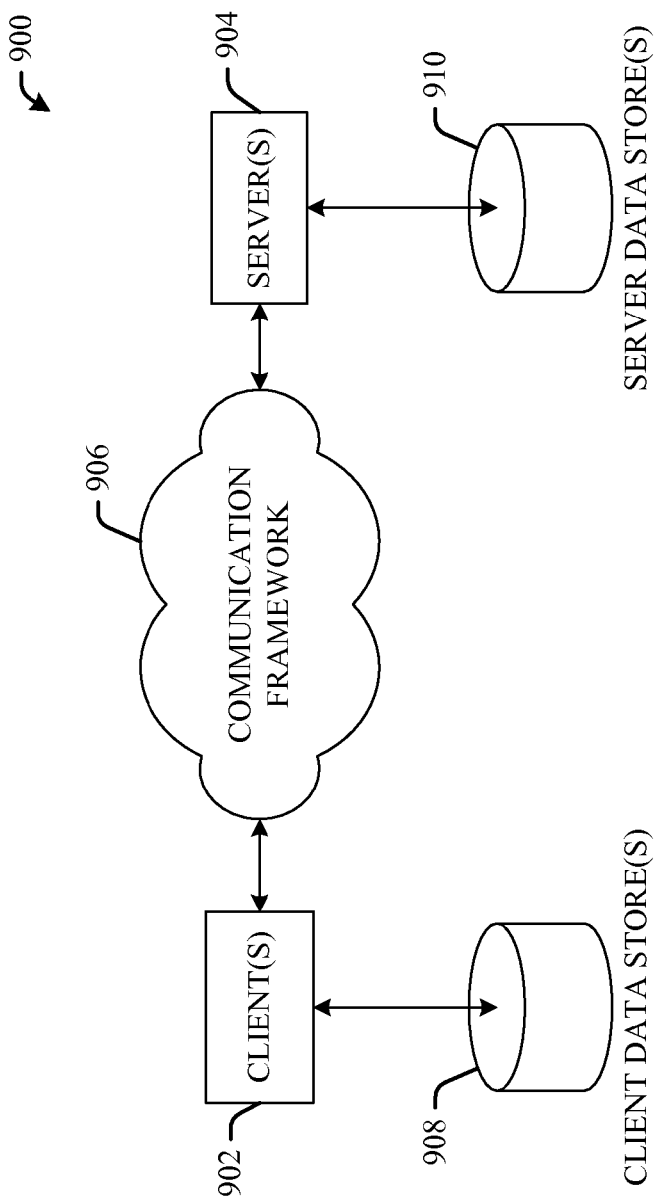
FIG. 9 illustrates an example of a schematic block diagram of a computing environment in accordance with the subject specification.
Figure 10:
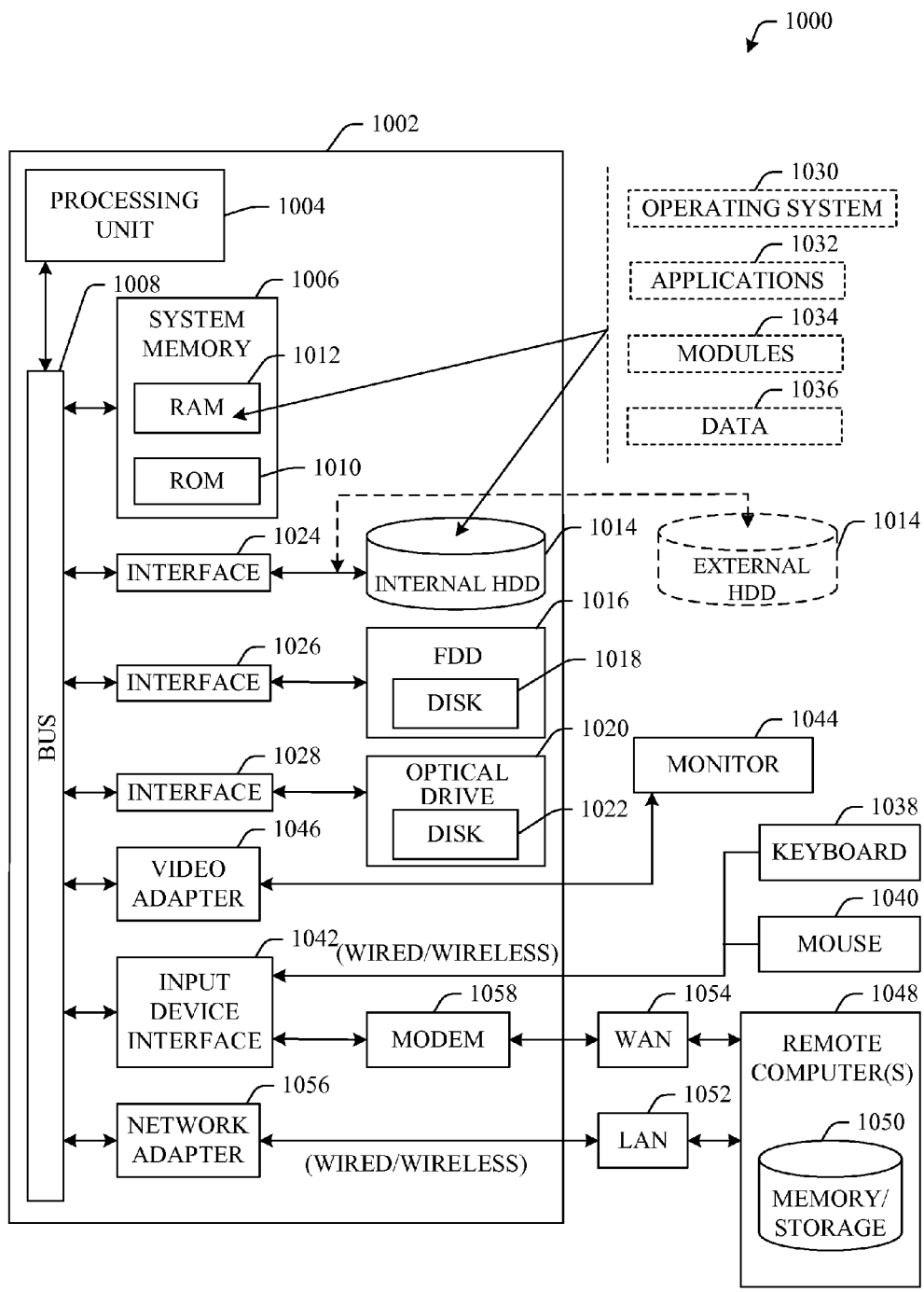
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject matter described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising
a hardware processor and a memory, the hardware processor configured to execute computer-executable instructions in the memory that cause the hardware processor to enable components that include;
a build component configured to facilitate online modification of an operating system to create a customized operating system for management of computer hardware and software resources;
at least one module of the operating system configured to be selectively installed or removed from the operating system by the build component, to create the customized operating system;
artificial intelligence configured to make an inference and a determination for approval of a request to include the at least one module in the operating system;
a charge component configured to perform at least one financial function in conjunction with modification of the operating system; and
a transmission component configured to emit the customized operating system.

2. The system of claim 1, further comprising a reception component configured to obtain the at least one module capable of integration with the operating system.

3. The system of claim 1, further comprising a placement component configured to integrate the at least one module into the operating system.

4. The system of claim 1, further comprising a feedback component configured to obtain reaction information that relates to the customized operating system.

5. The system of claim 1, further comprising an assistance component configured to provide a tool to a user for modification of the operating system.

6. The system of claim 1, further comprising a test component configured to determine if there is at least one error in the customized operating system.

7. The system of claim 6, further comprising a correction component configured to attempt to fix at least one determined error.

8. The system of claim 1, further comprising a proposition component configured to suggest at least one unit to be integrated with the operating system.

9. The system of claim 1, wherein the build component is configured to alter an operating system transferred from an auxiliary location.

10. The system of claim 9, wherein the auxiliary location is a device capable of running the operating system.

11. A method for online operating system development performed by a computer system executing machine-readable instructions, the method comprising acts of:
   creating a customized operating system for management of computer hardware and software resources based on online modification of an operating system;
   selectively installing or removing at least one module from the operating system to create the customized operating system;
   making an inference and a determination for approval of a request to include the at least one module in the operating system; and
   performing at least one financial function in conjunction with modification of the operating system.

12. The method of claim 11, further comprising presenting a tool to facilitate reception of at least one request.

13. The method of claim 11, further comprising locating a requested module.

14. The method of claim 11, further comprising testing the customized operating system.

15. The method of claim 11, further comprising transmitting the customized operating system.

16. The method of claim 11, further comprising gathering feedback concerning the customized operating system.

17. A method for online operating system development performed by a computer system executing machine-readable instructions, the method comprising acts of:
   initiating creation of a customized operating system from an operating system on an online server based on a request, the customized operating system for management of computer hardware and software resources;
   making an inference and a determination for approval of the request to install or remove at least one module;
   selectively installing the at least one module into the operating system or removing at least one module from the operating system, to create the customized operating system; and
   transmitting the customized operating system based on the request.

18. The system of claim 17, further comprising introducing the operating system into a portion of a virtual machine, wherein a portion without the operating system can run a supplemental operating system.

19. The system of claim 17, further comprising obtaining the at least one module as capable of integration with the operating system and integrating the at least one module into the operating system as part of installing the at least one module.

20. The system of claim 17, further comprising downloading the customized operating system to a virtual machine, and booting the customized operating system from the virtual machine.

* * * * *